(12) United States Patent
Kuroda et al.

(10) Patent No.: US 7,985,470 B2
(45) Date of Patent: Jul. 26, 2011

(54) DIAMOND SINTERED COMPACT (75) Inventors: Yoshihiro Kuroda, Itami (JP); Satoru Kukino, Itami (JP); Tomohiro Fukaya, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 701 days.

(21) Appl. No.: 11/886,433

(22) PCT Filed: Feb. 2, 2007

(86) PCT No.: PCT/JP2007/051825
§ 371 (c)(1),
(2), (4) Date: Sep. 14, 2007

(87) PCT Pub. No.: WO2008/096402
PCT Pub. Date: Aug. 14, 2008

(65) Prior Publication Data
US 2009/0208301 A1 Aug. 20, 2009

(51) Int. Cl.
*B23B 27/00* (2006.01)
(52) U.S. Cl. ............ 428/325; 51/307; 51/309; 428/332; 428/408; 428/469; 428/698; 428/701
(58) Field of Classification Search .................... 51/307, 51/309; 428/325, 332, 408, 469, 698, 701
See application file for complete search history.

(56) References Cited

U.S. PATENT DOCUMENTS

| | | | | |
|---|---|---|---|---|
| 3,831,428 A | * | 8/1974 | Wentorf, Jr. et al. | 72/467 |
| 4,636,253 A | * | 1/1987 | Nakai et al. | 75/243 |
| 4,766,040 A | * | 8/1988 | Hillert et al. | 428/408 |
| 5,011,514 A | * | 4/1991 | Cho et al. | 51/295 |
| 5,441,817 A | * | 8/1995 | Rai | 428/551 |
| 5,498,480 A | * | 3/1996 | Tank et al. | 428/408 |
| 5,560,716 A | * | 10/1996 | Tank et al. | 384/492 |
| 5,618,625 A | * | 4/1997 | Okamura | 428/408 |
| 5,645,617 A | * | 7/1997 | Frushour | 51/295 |
| 5,759,216 A | * | 6/1998 | Kanada et al. | 51/295 |
| 6,063,333 A | * | 5/2000 | Dennis | 419/6 |
| 6,342,301 B1 | * | 1/2002 | Yoshida et al. | 428/408 |

(Continued)

FOREIGN PATENT DOCUMENTS
EP          1 190 791      *  3/2002

(Continued)

OTHER PUBLICATIONS

Lin, Tze-Pin, et al., "Residual Stresses in Polycrystalline Diamond Compacts", Journal of the American Ceramic Society, 1994, pp. 1562-1568, vol. 77, No. 6.

(Continued)

*Primary Examiner* — Archene Turner
(74) *Attorney, Agent, or Firm* — McDermott Will & Emery LLP (57) ABSTRACT

An object is to raise both the wear resistance and chipping resistance of diamond sintered compacts while taking advantage of the characteristics of highly chipping-resistant microfine-grain diamond sintered compacts. A sintered diamond layer 3 is formed by sintering diamond grains and a binder on a cemented carbide substrate 2. This sintered diamond layer 3 comprises a main diamond layer 4 and a Co-rich diamond layer 5 that is present between the main diamond layer 4 and the cemented carbide substrate 2 and that has a Co content larger than that of the main diamond layer 4; the main diamond layer has a residual compressive stress of 1.5 GPa to 3 GPa.

10 Claims, 1 Drawing Sheet

U.S. PATENT DOCUMENTS

| | | | | |
|---|---|---|---|---|
| 6,344,149 B1 * | 2/2002 | Oles | ............................... | 427/307 |
| 6,432,150 B1 * | 8/2002 | Levashov et al. | ................ | 51/309 |
| 6,544,308 B2 * | 4/2003 | Griffin et al. | ................... | 51/309 |

FOREIGN PATENT DOCUMENTS

| | | |
|---|---|---|
| JP | 39-20483 | 9/1964 |
| JP | 52-12126 | 4/1977 |
| JP | 61-125739 | 6/1986 |
| JP | 02-199072 | 8/1990 |
| JP | 09-234604 | 9/1997 |
| JP | 2000-54007 | 2/2000 |
| JP | 2001-187431 | 7/2001 |
| JP | 3327080 | 7/2002 |
| JP | 3391231 | 1/2003 |
| JP | 2005-239472 | 9/2005 |
| RU | 2 034 937 * | 5/1995 |

OTHER PUBLICATIONS

Front page of Published International Application No. PCT/JP2007/051825.

International Preliminary Report on Patentability issued in International Application No. PCT/JP2007/051825, mailed Aug. 13, 2009.

Japanese Office Action issued in Japanese Patent Application No. 2005-350794, mailed Jan. 5, 2010.

* cited by examiner

FIG. 1

FIG. 2

DIAMOND SINTERED COMPACT

RELATED APPLICATIONS

This application is the U.S. National Phase under 35 U.S.C. §371 of International Application No. PCT/JP2007/051825, filed on Feb. 2, 2007, the disclosure of which Application is incorporated by reference herein.

TECHNICAL FIELD

The present invention relates to a highly wear resistant, highly chipping resistant diamond sintered compact that is well-adapted for use as the cutting edge of a cutting tool as typified by turning tools, milling cutters, and end milling cutters, as a material for wear resistant tools as typified by wire drawing dies, and as an electronic material, e.g., an electrode component.

BACKGROUND ART

Diamond is the hardest substance on earth, and diamond sintered compacts, which are artificially produced using diamond grains as a starting material, are used, for example, for cutting tools and wear-resistant tools. For example, Japanese Patent Publication Nos. S39-20483 and S52-12126 disclose diamond sintered compacts obtained by sintering diamond grains using an iron group metal, for example, cobalt, as the binder. The diamond sintered compacts disclosed in Japanese Patent Publication Nos. S39-20483 and S52-12126 are widely used as the cutting edge material of tools for cutting nonferrous metals, such as Al—Si alloys, due to their resistance to the chipping caused by the cleavability that is a disadvantage of single crystal diamond.

Among these diamond sintered compacts, diamond sintered compacts with a large average diamond grain size, for example, with an average grain size of at least 20 µm but no more than 100 µm, have a high diamond content and thus an excellent wear resistance. On the other hand, diamond sintered compacts with a small average diamond grain size, for example, diamond sintered compacts composed of microfine diamond grains with an average grain size less than 5 µm, have an excellent resistance to chipping. Within this category of diamond sintered compacts, a particularly excellent resistance to chipping is exhibited by diamond sintered compacts constituted of ultrafine diamond grains with an average grain size no greater than 1 µm.

Efforts to improve the properties of diamond sintered compacts were thus limited to either devising improvements in the resistance to chipping by reducing the size of the starting diamond grains or devising improvements in the wear resistance by increasing the size of the starting diamond grains.

The idea of coating a binder on microfine diamond grains was then devised, as disclosed in Japanese Patent 3,327,080. This coating with a binder made it possible to carry out a high-density sintering in which binder pools, voids, and impurities were scarce. This procedure provided a diamond sintered compact with an improved wear resistance, the lack of which is a weak point of microfine-grain diamond sintered compacts, and this diamond sintered compact has been commercialized and has entered into practical application.

However, even with a reduction in binder pools, voids, and impurities, in order to sinter microfine diamond grains to the same high diamond content as the highly wear-resistant coarse-grain diamond sintered compacts, higher temperatures and pressures are required, even within the context of the sintering conditions at which diamond can be produced, in order to cope with the increase in frictional force between grains brought about by the increase in the surface area of the grains. Under these circumstances, abnormal grain growth of the diamond grains readily occurs in the case of ultrafine diamond grains due to their very high activity. A sintered compact containing regions of abnormal grain growth cannot be cut with a wire electric discharge machine (WEDM), and the mechanical strength of the diamond is also reduced. Since abnormal grain growth is unavoidable when sintering is carried out on starting materials of ultrafine diamond grains with a grain size no greater than 1 µm and an iron group metal such as cobalt (Co) or tungsten carbide (WC)—Co, it is quite difficult to obtain a diamond compact sinter having a uniform structure and a grain size no greater than 1 µm in good yields.

As a consequence, ultrafine diamond grains with a size no greater than 1 µm can in actuality not be sintered at the same content as coarse-grain diamond grains having an average grain size of 20 to 30 µm, and diamond sintered compacts composed of ultrafine diamond grains with a size no greater than 1 µm therefore have a wear resistance inferior to that of diamond sintered compacts composed of diamond grains having an average grain size of 20 to 30 µm.

Japanese Patent 3,391,231 discloses that the chipping resistance, the lack of which is a weak point of coarse-grain diamond sintered compacts is improved by mixing diamond grains with an average grain size of 20 to 30 µm with diamond grains with an average grain size of 2 to 4 µm. However, due to the content of diamond grains with an average grain size of 20 to 30 µm, the strength of such diamond sintered compacts is lower than that of diamond sintered compacts composed of ultrafine diamond grains with a size no greater than 1 µm and the reliability is inadequate from a practical standpoint.

Japanese Patent Application Laid-open No. 2005-239472 discloses a diamond sintered compact in which the diamond grains are bonded to each other using a binder comprising Co and the carbide of, for example, an element from group 4, 5, or 6 of the Periodic Table. The disclosed diamond sintered compact has a specific diamond grain size and content and a specific content of, for example, Co, in the binder and contains the carbide in a specific form, in order to obtain a diamond sintered compact having an excellent wear resistance, chipping resistance, impact resistance, and so forth through an inhibition of abnormal grain growth during the sintering process and a strengthening of direct bonding between the diamond grains. However, due to a lack of any device directed to the interface between the diamond sintered compact and the cemented carbide substrate, tensile stresses act on the bonding region between the cemented carbide substrate and the diamond sintered compact and the diamond sintered compact suffers a reduction in strength and/or delamination and as a consequence consistent production has not been possible.

With regard to the residual stresses in diamond sintered compacts, the relationships between diamond sintered compacts with specific dimensions and the residual stresses in the diamond sintered compacts are reported in *J. Am. Ceram. Soc.*, 77 [6] 1562-68 (1994). The residual stresses in diamond sintered compacts were measured and computed as a function of the diameter of the diamond sintered compact, the thickness of the cemented carbide substrate, and the configuration of the cemented carbon substrate. The maximum residual compressive stress obtained as a result was 1.5 GPa. This shows that it will not be possible to stably produce diamond sintered compacts endowed with residual compressive stresses of 1.5 GPa or more using the prior-art structures in which starting materials comprising diamond grains and an iron group metal such as Co or WC—Co are sintered. Moreover, even if this production were possible, large strains would be produced between the cemented carbide substrate and the diamond layer endowed with high residual compressive stress and stable production would not be possible due to delamination at the interface.

Patent Document 1: Japanese Patent Publication No.39-20483
Patent Document 2: Japanese Patent Publication No.52-12126
Patent Document 3: Japanese Patent No.3327080
Patent Document 4: Japanese Patent No.3391231
Patent Document 5: Japanese Patent Publication No.2005-239472
Non-Patent Document 1: J. Am. Ceram. Soc. 77 [6]1562-68 (1994)

DISCLOSURE OF THE INVENTION

Problems That the Invention is to Solve

As described above, the chipping resistance and wear resistance of prior-art diamond sintered compacts have been governed by the grain size of the diamond grains used as the starting material, and it has not been possible to have a diamond sintered compact which has both an excellent chipping resistance and an excellent wear resistance. An object of the present invention is to increase the wear resistance while taking advantage of the excellent chipping resistance that is a characteristic of microfine-grain diamond sintered compacts.

Means for Solving the Problems

In order to achieve this object, the present invention comprises a diamond sintered compact that has a cemented carbide substrate and a sintered diamond layer and that is obtained by sintering diamond grains and a binder on a cemented carbide substrate, wherein the sintered diamond layer comprises a main diamond layer and a cobalt-rich diamond layer that has a higher cobalt content than the main diamond layer and that is present between the main diamond layer and the cemented carbide substrate, wherein the main diamond layer has a residual compressive stress of 1.5 GPa to 3 GPa.

The inventors of the present application, as a result of intensive investigations carried out in search of a measure that would increase the wear resistance while taking advantage of the chipping resistance that is a characteristic feature of microfine-grain diamond sintered compacts, discovered as a result that the wear resistance and also the chipping resistance could be dramatically increase by controlling, to 1.5 GPa to 3 GPa, the residual compressive stress in a main diamond layer that had been considered, as described in section 0004 of Japanese Patent 3,327,080, to have an inadequate reliability in practical terms due to a reduction in the strength of the diamond sintered compact due to a large residual strain.

In order to stop the generation of a large strain in the bonding region between the cemented carbide substrate and the sintered diamond layer, a Co-rich diamond layer that has a higher Co content than the main diamond layer is deposited in the diamond sintered compact of the present invention between the cemented carbide substrate and the main diamond layer of the sintered diamond layer: the difference between the Young's modulus of the main diamond layer and the Young's modulus of the cemented carbide substrate is absorbed by this Co-rich diamond layer.

The main diamond layer of the diamond sintered compact according to the present invention preferably contains a compound of at least one element selected from carbon, nitrogen, and oxygen with at least one element selected from titanium (Ti), zirconium (Zr), hafnium (Hf), vanadium (V), niobium (Nb), tantalum (Ta), chromium (Cr), and molybdenum (Mo), in an amount such that the content of the at least one element selected from titanium, zirconium, hafnium, vanadium, niobium, tantalum, chromium, and molybdenum is at least 0.1 weight % but not more than 8 weight %. It is more preferred when an element selected from Ti, Zr, Hf, V, Nb, Ta, Cr, and Mo is Ti. This compound is preferably titanium carbide (TiC) and/or titanium carbonitride (TiCN). A compound containing Co—Ti alloy and/or Co—W—Ti alloy and trace amounts of at least one element selected from carbon, nitrogen, and oxygen is preferred for this compound because this can raise the bonding strength between the diamond grains.

The difference between the Co content of the Co-rich diamond layer and the Co content of the main diamond layer is preferably in the range of 1 to 30 volume % and more preferably in the range of 10 to 20 volume %, while the thickness of the Co-rich diamond layer is preferably at least 0.01 mm but not more than 0.07 mm and more preferably is at least 0.02 mm but not more than 0.055 mm.

The average grain size of the diamond grains in the main diamond layer is preferably no greater than 10 µm, more preferably no greater than 5 µm, and even more preferably no greater than 1 µm.

The cemented carbide substrate used in the diamond sintered compact of the present invention is preferably a substrate having a Young's modulus of 550 to 650 GPa and a Co content of 5.0 to 15.0 weight % or a substrate that contains at least 0.1 weight % but not more than 8 weight % of a compound that contains titanium and at least one element selected from carbon, nitrogen, and oxygen. The titanium is considered to be present in the form of TiC, TiCN, and so forth, but any is acceptable with TiC being preferred.

The residual stress of 1.5 GPa to 3 GPa in the main diamond layer is the residual stress measured by any of the following three methods from (1) to (3).

(1) Using an X-ray diffraction instrument that employs Ni-filtered Cu—Kα X-radiation, the X-ray diffraction from the (111) lattice plane of the main diamond layer is measured by the $\sin^2 \Psi$ method (side inclination method) under excitation conditions of 40 kV and 45 mA, and the residual compressive stress is calculated using a Young's modulus of 1071 GPa and a Poisson's ratio of 0.20.

(2) Using the same procedure and conditions as in (1) above, the X-ray diffraction from the (200) lattice plane of the Co in the main diamond layer is measured and the residual compressive stress is calculated using a Young's modulus of 100 GPa and a Poisson's ratio of 0.30.

(3) Using the same procedure and conditions as in (1) above, the X-ray diffraction from the (200) lattice plane of the TiC in the main diamond layer is measured and the residual compressive stress is calculated using a Young's modulus of 450 GPa and a Poisson's ratio of 0.30.

The present invention also provides an indexable insert for a cutting tool, in which the cutting edge of the corner region is formed by a diamond sintered compact with the structure described hereinabove.

The diamond sintered compact of the present invention can provide a dramatic increase not only in wear resistance, but also in chipping resistance, because a large compressive stress has been induced to remain therewithin while delamination in the bonding region between the cemented carbide substrate and the sintered diamond layer is inhibited.

The specific reasons for this are believed to be as follows. By causing a large compressive stress to remain, the wear resistance is substantially improved due to an increase in the mechanical strength of the diamond grains themselves and a capacity to inhibit grain shedding due to an increase in the bonding strength between diamond grains and in the diamond grain-binder bonding strength. Moreover, the chipping resistance is also substantially increased due, in addition to this increase in mechanical strength, to the fact that the generation and propagation of cracks in the sintered diamond layer can also be inhibited.

The use of cemented carbide having a high coefficient of linear expansion for the substrate is effective for inducing a high residual compressive stress. When the cemented carbide substrate that is sintered at the same time as the sintered diamond layer has a high coefficient of linear expansion, compressive stress is imparted to the main diamond layer due to the large volumetric change with greater contraction when the temperature is dropped from the high sintering temperature to ambient temperature. When, on the other hand, a cemented carbide substrate having a low Young's modulus is used, tensile stress is imparted to the main diamond layer due to the large volumetric change with greater expansion when the high pressure used during sintering is released. As a consequence, making the tensile stress applied to the main diamond layer as small as possible by using a cemented carbide substrate with a high Young's modulus is effective for inducing a high residual compressive stress. However, cemented carbides that have a high coefficient of linear expansion have a low Young's modulus, and because of this when the cemented carbide substrate is used in the absence of some ingenuity it acts so as to apply tensile stress to the bonding region between the cemented carbide substrate and the diamond sintered compact, resulting in the facile occurrence of a reduction in the strength of the sintered diamond layer and/or delamination of the sintered diamond layer.

In order to avoid this problem, a Co-rich diamond layer having a Co content larger than that of the main diamond layer has been deposited between the cemented carbide substrate and the main diamond layer. When this Co-rich diamond layer is present, the difference between the Young's modulus of the main diamond layer and the Young's modulus of the cemented carbide substrate is absorbed and the change in the Young's modulus is relaxed, which as a consequence endows the diamond sintered compact with a high residual compressive stress without generating tensile stress between the sintered diamond layer and the cemented carbide substrate. This in turn enables a thorough manifestation of the effect of increasing the wear resistance and chipping resistance.

The reasons for the limitations on the size of the residual compressive stress in the diamond sintered compact, the Co content in the Co-rich diamond layer, and the thickness of the Co-rich diamond layer are described in the paragraphs that follow.

The diamond sintered compact of the present invention can achieve a dramatic increase not just in the wear resistance, but also in the chipping resistance. This is achieved by establishing, between the main diamond layer and the cemented carbide substrate, a cobalt-rich diamond layer that has a cobalt content higher than that of the main diamond layer and by bringing the residual compressive stress in the main diamond layer to 1.5 GPa to 3 GPa. This enables a high residual compressive stress to be induced therewithin while inhibiting delamination in the bonding region between the cemented carbide substrate and sintered diamond layer, thereby achieving the dramatic increase in both wear resistance and chipping resistance. The wear resistance can thus be raised while taking advantage of the characteristic features of highly chipping-resistant microfine-grain diamond sintered compacts.

BEST MODE FOR CARRYING OUT THE INVENTION

Embodiments of the diamond sintered compact according to the present invention are described in the following. The layer structure of a diamond sintered compact 1 is shown schematically in FIG. 1. Reference number 2 in the drawing indicates a cemented carbide substrate, while 3 indicates a sintered diamond layer formed on the cemented carbide substrate 2. The sintered diamond layer 3 is constituted of a main diamond layer 4 and a Co-rich diamond layer 5 that has a Co content greater than that of the main diamond layer 4.

The residual stress in the main diamond layer is preferably a compressive stress of 1.5 GPa to 3 GPa. When the residual compressive stress is less than 1.5 GPa, the wear resistance and chipping resistance of the main diamond layer are determined by the grain size of the diamond grains employed as a starting material and an excellent wear resistance and an excellent chipping resistance cannot be provided. In addition, when the residual compressive stress is larger than 3 GPa, spontaneous fracture is produced in the bonding phase region and becomes a primary cause of internal defects, resulting in a reduction in the strength of the diamond sintered compact and an unsatisfactory reliability from a practical standpoint.

The main diamond layer contains diamond grains and a binder.

The diamond grains in the main diamond layer are preferably not too large. For example, diamond grains with a grain size in excess of 20 μm undergo chipping due to cleavage of the grains themselves, and as a consequence a diamond sintered compact that has a main diamond layer that contains diamond grains larger than 20 μm has a poor chipping resistance. As a result, the diamond grains of the main diamond layer have an average particle size preferably no larger than 10 μm, more preferably no larger than 5 μm, and even more preferably no larger than 1 μm. The proportions for the diamond grains and binder are, for example, 80 to 99 volume % diamond grains with the binder making up the remainder.

The binder may be any well known binder that contains Co-containing solvent metal. More preferably the binder is, for example, solvent metal comprising a compound of Co, at least one element selected from Ti, Zr, Hf, V, Nb, Ta, Cr, and Mo, and at least one element selected from carbon, nitrogen, and oxygen.

Figure 1:
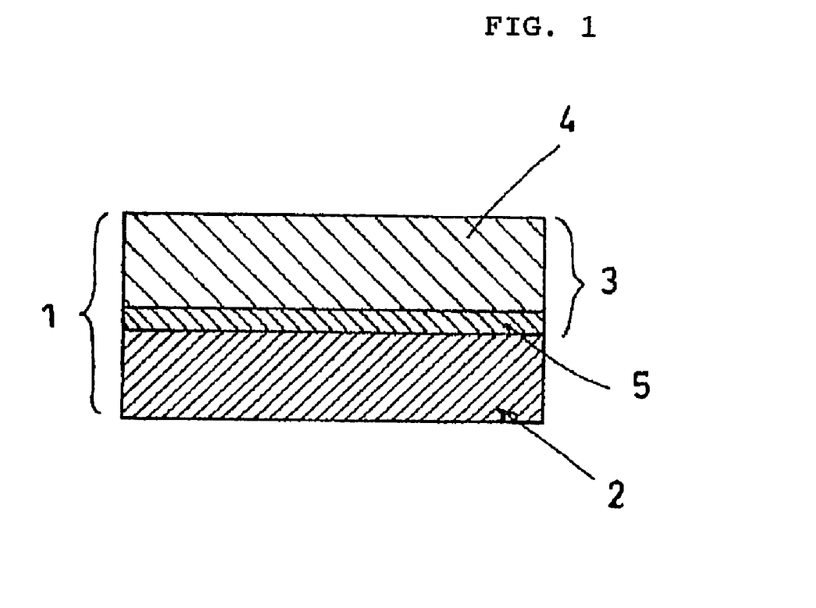
FIG. 1 is a cross-sectional drawing that schematically shows the layer structure of the diamond sintered compact of the present invention.

In order to apply a high residual compressive stress in the main diamond layer 4, the main diamond layer preferably contains a compound of at least one element selected from carbon, nitrogen, and oxygen and at least one element selected from Ti, Zr, Hf, V, Nb, Ta, Cr, and Mo.

A high residual compressive stress can be applied by using a binder containing such a compound to bring about the presence of such a compound in the main diamond layer 4. The reason for this is as follows: since these compounds have a higher Young's modulus than Co, the Young's modulus of the main diamond layer 4 can be controlled through the presence of these compounds in the main diamond layer, thereby making it easier to keep the strain small and bring about a high residual compressive stress therein.

When the temperature drops from the high sintering temperature to ambient temperature, Co, with its large coefficient of linear expansion, undergoes a large volumetric change and becomes overly small, and as a consequence gaps can occur among the diamond grains in the resulting sintered diamond layer. In contrast, the compounds cited above have a small coefficient of linear expansion, and causing such a compound to be present in the main diamond layer 4 as a substitute for a portion of the Co results in a small volumetric change, small gaps between diamond grains, and the generation of a high-density sintered compact. This enables the generation therein of a high residual compressive stress.

The content of the aforementioned at least one element selected from Ti, Zr, Hf, V, Nb, Ta, Cr, and Mo in the main diamond layer is preferably at least 0.1 weight % but no more than 8 weight %. An adequate effect with regard to inducing a high residual compressive stress in the main diamond layer is not obtained at less than 0.1 weight %. At an addition in excess of 8 weight %, the addition of Co in an amount that will adequately provide the effects of a binder results in a low diamond content and also in a substantial interference with bonding between diamond grains; both the wear resistance and chipping resistance will be reduced as a consequence. This content is more preferably at least 1 weight % but no more than 7 weight %.

Ti is preferably an element selected from Ti, Zr, Hf, V, Nb, Ta, Cr, and Mo. This is because with titanium compounds there is little interference with the bonding between diamond grains and the factors that reduce the wear resistance and chipping resistance of the main diamond layer are kept to a minimum.

TiC, TiCN, and so forth are acceptable for this titanium compound, with TiC being preferred. Also preferred is a compound that contains Co—Ti alloy and/or Co—W—Ti alloy and trace amounts of at least one element selected from carbon, nitrogen, and oxygen. The reasons for this are as follows: the aforementioned compounds exhibit little interference with bonding between diamond grains; in addition, by replacing a portion of the Co binder component with a compound that has a higher heat resistance than Co, the heat resistance of the diamond sintered compact can be raised and heat-induced wear can be inhibited. Moreover, unlike a binder such as pure Co that is overly reactive with diamond, the aforementioned compounds have an appropriate reactivity and abnormal grain growth can thereby be inhibited.

The thickness of the main diamond layer is preferably 0.1 to 1.5 mm and particularly preferably 0.25 to 0.35 mm.

The following methods from (i) to (iii) are provided as examples of the method for depositing a Co-rich diamond layer between the cemented carbide substrate and the main diamond layer, but any method may be used.

(i) In this method, a paste prepared by mixing 30 to 60 weight % Co powder into diamond powder is coated on a cemented carbide substrate; this paste is overlaid and brought into contact with the main diamond layer starting material obtained by mixing diamond grains with binder; and sintering is carried out thereon.

(ii) In this method, with the starting material for the main diamond layer residing on and in contact with the cemented carbide substrate, Co is deposited at the interface between the cemented carbide substrate and the main diamond layer starting material by carrying out a heat treatment (about 10 minutes at 1300° C.) in a reducing atmosphere of ($CO+CO_2$) in which the CO concentration is 2 to 15%.

(iii) This method employs a Co-containing superalloy substrate as the cemented carbide substrate. Cemented carbide protrusions with a height of about 1 to 100 μm and a diameter of about 5 to 50 μm are disposed or molded on the interface of this superalloy substrate that will come into contact with the main diamond layer starting material, in such a manner that the area ratio of the protrusion end surface with respect to the area of the face of the cemented carbide on which the sintered compact starting material will be layered is no more than 50%. The cemented carbide substrate is thus set up so as to enable control of the Co around these protrusions (interface between the cemented carbide substrate and the diamond layer) after the high-temperature, high-pressure sintering step, although no anchoring effect will be present due to dissolution in the diamond sintered compact layer during sintering, and the main diamond layer starting powder is layered on this cemented carbide substrate.

In order to adequately have the ability to absorb the difference between the Young's modulus of the cemented carbide substrate 2 and the Young's modulus of the main diamond layer 4, the Co in the Co-rich diamond layer 5 is preferably made from 1 to 30 volume % larger than the Co content of the main diamond layer 4 and more preferably is made from 10 to 20 volume % larger. The Young's modulus undergoes almost no change when the Co content of the Co-rich diamond layer 5 is less than 1 volume % larger than the Co content of the main diamond layer 4, and the difference between the Young's modulus of the cemented carbide substrate 2 and the Young's modulus of the main diamond layer 4 can then not be absorbed. As a consequence, the residual strain becomes large and the strength of the diamond sintered compact is reduced. When this content difference exceeds 30 volume %, the diamond content of the Co-rich diamond layer 5 drops to the point that this layer has a low strength and the main diamond layer 4 is then prone to delamination from the cemented carbide substrate 2.

The thickness of the Co-rich diamond layer 5 is preferably at least 0.01 mm but no more than 0.07 mm and more preferably at least 0.02 mm but no more than 0.055 mm. When the Co-rich diamond layer 5 is thinner than 0.01 mm, the Co-rich diamond layer 5 has little capacity to absorb the difference in the Young's modulus and the strength of the diamond sintered compact is reduced as a result. When this thickness is greater than 0.07 mm, the main diamond layer 4 readily delaminates from the cemented carbide substrate 2. The thickness of the Co-rich diamond layer can be adjusted, for example, by changing the mixing proportions for the diamond powder and Co powder in the aforementioned method (i).

The thickness of the cobalt-rich diamond layer can be determined, for example, by measuring the Co distribution by, for example, EDS analysis.

The cemented carbide substrate 2 is a substrate of an alloy whose main constituent is WC, wherein a substrate having a Young's modulus of 550 to 650 GPa and a Co content of 5.0 to 15.0 weight % or a substrate that contains 0.1 to 8 weight % of a compound that contains titanium and at least one element selected from carbon, nitrogen, and oxygen is preferred. This compound is more preferably TiC. When the Young's modulus of this cemented carbide substrate 2 is less than 550 GPa, the difference from the Young's modulus of the diamond sintered compact becomes overly large, and, even when a Co-rich diamond layer is provided, this difference cannot be absorbed and an effect by which tensile stress is applied to the diamond sintered compact becomes dominant, resulting in the facile occurrence of delamination of the main diamond layer. When this Young's modulus exceeds 650 GPa, cracking and fissuring are readily generated in the cemented carbide substrate upon the application of high pressures whereupon the uniformity of the sintered compact will be degraded and the manufacturing yield will be reduced. The cemented carbide substrate 2 therefore preferably has a Young's modulus of 550 to 650 GPa.

When the Co content of this cemented carbide substrate 2 is less than 5.0 weight %, Co infiltration into the diamond layer is prone to be inadequate. Since bonding between diamond grains does not adequately develop under this condition of binder deficiency, the wear resistance and chipping resistance of the diamond layer both deteriorate, caused by grain shedding and crack propagation. The Co content of the cemented carbide substrate 2 is therefore preferably at least 5.0 weight %. When this Co content is greater than 15.0 weight %, the Young's modulus of the cemented carbide substrate 2 declines and large deformations readily occur in the substrate during sintering. These deformations cause a deterioration in the uniformity of the diamond sintered compact and create a high likelihood of a reduced manufacturing yield. The upper limit of the Co content of the cemented carbide substrate 2 is therefore preferably 15.0 weight %.

Introducing a compound that contains titanium and at least one element selected from carbon, nitrogen, and oxygen into the cemented carbide substrate, said compound having a higher coefficient of linear expansion than WC, makes it possible to control the coefficient of linear expansion of the cemented carbide substrate. While the coefficient of linear expansion of the cemented carbide substrate can also be raised by increasing the Co content of the cemented carbide substrate, increasing the Co quantity causes the thickness and/or the Co content of the Co-rich diamond layer to become too large, which facilitates the occurrence of delamination or chipping of the diamond sintered compact during cutting operations. In addition, the Young's modulus of the cemented carbide substrate undergoes a decline and large deformations readily occur in the substrate during sintering. These deformations cause a deterioration in the uniformity of the diamond sintered compact and create a high likelihood of a reduced manufacturing yield. Thus, the presence of high internal residual compressive stresses can be induced at good yields by the introduction into the cemented carbide substrate of a compound of titanium and at least one element selected from carbon, nitrogen, and oxygen.

The content of the compound containing titanium and at least one element selected from carbon, nitrogen, and oxygen in the aforementioned cemented carbide substrate is preferably 0.1 to 8 weight %. When the content of this compound is less than 0.1 weight %, the content is insufficient for the manifestation of the effect of raising the coefficient of linear expansion. When the content of this compound exceeds 8 weight %, the reduction in the content of the WC, with its high Young's modulus, causes the Young's modulus to be too low, resulting in the facile occurrence of delamination of the diamond sintered compact during cutting operations. The more preferred range for the content of this compound is 1 to 7 weight %.

The diamond sintered compact according to the present invention is produced by sintering the diamond grains and binder on the aforementioned cemented carbide substrate 2 under high-pressure and high-temperature conditions at which diamond is thermodynamically stable. The thermodynamically stable conditions of high pressure and high temperature cited here specifically denote a pressure of at least 5 GPa but no more than 8 GPa and a temperature of at least about 1200° C. but no more than about 1900° C.

Examples of the present invention are provided below.

Example 1

Diamond sintered compacts designated as sample nos. 11 to 20 were produced using cemented carbide substrates with the compositions shown in Table 1. The residual compressive stress in the main diamond layer was measured. Also measured was the amount of cutting tool flank wear when the obtained diamond sintered compact was used as the cutting edge in a cutting tool.

The diamond sintered compacts were specifically produced as follows. Diamond grains (diamond powder) with an average grain size of 5 μm and binder (Co powder) were first dry mixed in a mixing proportion of 80 weight % diamond grains and 20 weight % Co powder. The binder used for sample no. 16 was a mixture of 16 weight % Co powder and 4 weight % titanium powder, while the binder used for sample no. 17 was a mixture of 12 weight % Co powder and 8 weight % titanium powder.

The diamond grain and binder starting mixture was filled into a tantalum container so as to come into contact with a substrate (disk); this substrate was formed of cemented carbide with the particular composition shown in Table 1 and had been coated with a paste prepared by mixing 50 weight % Co powder into diamond powder. The diamond was then sintered using a belt-type ultrahigh-pressure apparatus at a pressure of 6.0 GPa and a temperature of 1550° C. with a holding time of 10 minutes. The cemented carbide substrate used had a thickness of 0.3 mm, and the sum of the thickness of the resulting main diamond layer and the thickness of the cobalt-rich diamond layer was 0.4 mm. The grain sizes of the diamond grains in the resulting main diamond layer were examined by SEM (scanning electron microscope) secondary electron imaging, yielding an average grain size of 8 μm.

The residual stress was measured by the following procedure on each of the diamond sintered compacts.

Procedure for Measuring Residual Stress

Using an X-ray diffraction instrument that employed Ni-filtered Cu—Kα X-radiation, the X-ray diffraction from the (111) lattice plane of the main diamond layer was measured by the $\sin^2 \Psi$ method (side inclination method) under excitation conditions of 40 kV and 45 mA and the residual compressive stress was calculated using a Young's modulus of 1071 GPa and a Poisson's ratio of 0.20.

Each of the diamond sintered compacts was processed into a plate-shaped test specimen with dimensions of length 6 mm×width 3 mm×thickness 0.7 mm, and the transverse rupture strength was measured on each test specimen using a three-point bending test with a 4 mm span distance.

Figure 2:
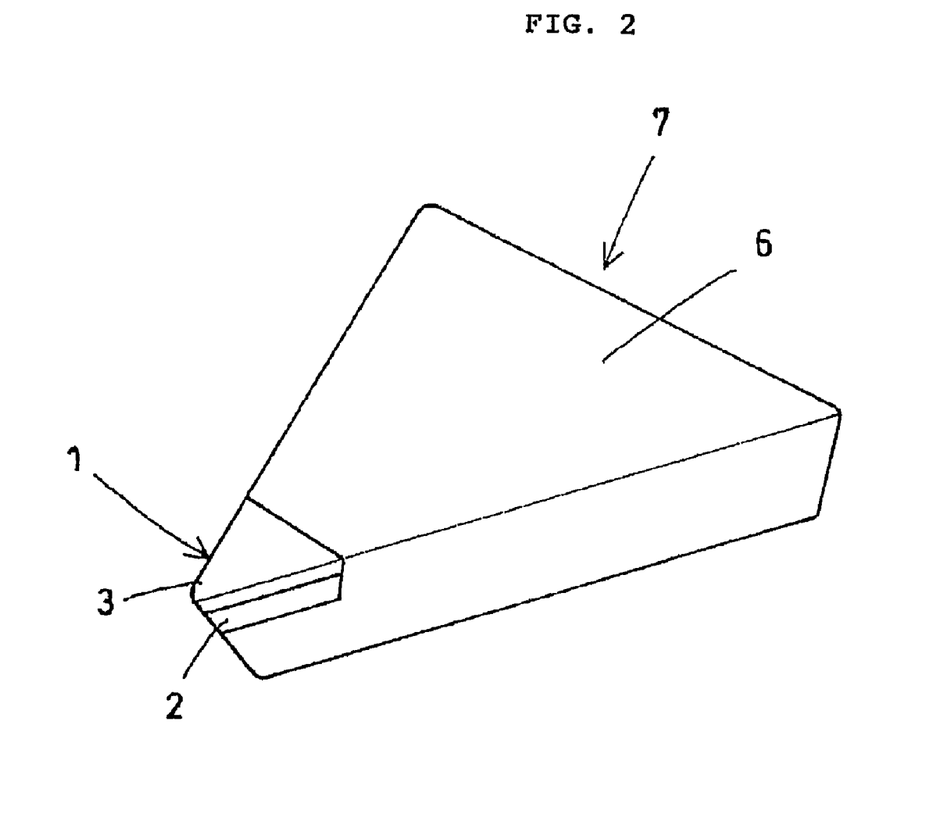
FIG. 2 is an oblique drawing that shows an example of an indexable insert that uses a diamond sintered compact of the present invention as its cutting edge.

A sintered compact cutting insert 7 (indexable insert, ISO standard: TPGN160304) was fabricated in which the diamond sintered compact 1 for the particular sample was mounted at a corner of the anchor metal 6 having the shape shown in FIG. 2, i.e., the main face had the shape of an equilateral triangle. Cutting tests were carried out under the conditions given below. The amount of flank wear was measured for each sample, with the exception of sample nos. 11 and 18, for which the diamond sintered compact underwent delamination during the test. The results are shown in Table 1.

Cutting Conditions cutting workpiece: bar of Al alloy containing 16 weight % Si cutting conditions: peripheral turning, cutting velocity=800 m/min, cutting depth=0.5 mm, feed rate=0.12 mm/rev, wet cutting, cutting time=5 minutes standing the presence of the Co-rich diamond layer, and delamination of the main diamond layer occurred during the cutting test. Moreover, the transverse rupture strength was also lower than with sample nos. 12 and 13, demonstrating that the strength of the diamond sintered compact is reduced when the residual compressive stress exceeds 3 GPa.

TABLE 1

| | cemented carbide substrate | | | sintered diamond layer | | | | |
|---|---|---|---|---|---|---|---|---|
| Sample no. | composition (wt %) | Young's modulus | coefficient of linear expansion | binder composition (wt %) | thickness of Co—rich diamond layer (mm) | residual compressive stress in the main diamond layer (GPa) | amount of flank wear (μm) | transverse repture strength (GPa) | remarks |
| 11 | WC—20% Co | 530 | 6.0 | 20% Co | 0.063 | 3.043 | delamination occurred | 1.98 | comparative product |
| 12 | WC—15% Co | 550 | 5.5 | 20% Co | 0.059 | 2.641 | 34 | 2.47 | product according to the present invention |
| 13 | WC—10% Co | 580 | 5.1 | 20% Co | 0.055 | 2.495 | 35 | 2.38 | product according to the present invention |
| 14 | WC—5% Co | 630 | 5.0 | 20% Co | 0.049 | 2.559 | 34 | 2.39 | product according to the present invention |
| 15 | WC—3% Co | 630 | 4.5 | 20% Co | 0.032 | 1.404 | 59 | 1.79 | comparative product |
| 16 | WC—3% Co | 630 | 4.5 | 16% Co—4% Ti | 0.047 | 2.518 | 32 | 2.57 | product according to the present invention |
| 17 | WC—3% Co | 630 | 4.5 | 12% Co—8% Ti | 0.038 | 2.495 | 34 | 2.49 | product according to the present invention |
| 18 | WC—10% Co—12% TiC | 530 | 5.9 | 20% Co | 0.054 | 3.027 | delamination occurred | 1.86 | comparative product |
| 19 | WC—10% Co—8% TiC | 550 | 5.7 | 20% Co | 0.055 | 2.692 | 33 | 2.53 | product according to the present invention |
| 20 | WC—10% Co—4% TiC | 575 | 5.6 | 20% Co | 0.051 | 2.765 | 32 | 2.61 | product according to the present invention |

As may be understood from Table 1, changes in the composition of the cemented carbide substrate resulted in substantial changes in the residual stress in the diamond sintered compact and also in substantial changes in the transverse rupture strength of the diamond sintered compact and in the amount of flank wear during application as the cutting edge in a cutting tool. In the case of sample no. 11, which had the largest Co content in the cemented carbide substrate and which also had a large coefficient of linear expansion, the residual stress was also the largest and exceeded 3 GPa, and, due to the fact that the Young's modulus of the cemented carbide substrate was less than 550 GPa, the difference in the Young's modulus between the main diamond layer and the cemented carbide substrate could not be absorbed, notwithstanding the presence of the Co-rich diamond layer, and delamination of the main diamond layer occurred during the cutting test. Moreover, the transverse rupture strength was also lower than with sample nos. 12 and 13, demonstrating that the strength of the diamond sintered compact is reduced when the residual compressive stress exceeds 3 GPa.

In the case of sample no. 15, the residual compressive stress was less than 1.5 GPa, and as a consequence there was large flank wear during application as the cutting edge in a cutting tool and the transverse rupture strength was also low. In contrast, with sample nos. 12 to 14 and 16, 17, 19, and 20 (all products according to the present invention), which each had a residual compressive stress of at least 1.5 GPa, the flank wear during application as a cutting edge was substantially less than with sample no. 15 and the transverse rupture strength was also substantially larger than for sample no. 15. This shows that the wear resistance and chipping resistance are dramatically improved when the residual compressive stress is held at 1.5 GPa or more.

Even for the use of the same cemented carbide substrate, in the case of sample nos. 16 and 17, which contained titanium in the binder for the main diamond layer, a higher residual compressive stress was obtained and both the wear resistance and chipping resistance were thereby improved. However, sample no. 17, which contained 8 weight % Ti, had a lower wear resistance and chipping resistance than sample no. 16, which contained 4 weight %, which shows that a Ti content no greater than 8 weight % is preferred.

Otherwise, the samples that contained TiC in the cemented carbide substrate, that is, sample no. 19 with a TiC content of 8 weight % and sample no. 20 with a content of 4 weight %, provided both an improved wear resistance and an improved chipping resistance. However, in the case of sample no. 18, for which the TiC content was 12 weight %, the Young's modulus fell below 550 GPa and delamination of the diamond sintered compact occurred during the cutting operation. This demonstrates as a consequence that the content of TiC in the cemented carbide substrate is preferably no more than 8 weight %.

Example 2

Diamond sintered compacts designated as sample nos. 21 to 28 were fabricated using the ratios shown in Table 2 for the mixing quantities of the diamond powder and Co powder made into a paste for coating on the cemented carbide substrate. For purposes of comparison, the diamond sintered compact designated as sample no. 29 was fabricated without the application of the paste mixture of diamond powder and Co powder. The following were measured on the obtained diamond sintered compacts: the residual compressive stress, the difference between the Co content of the main diamond layer and the Co content of the Co-rich diamond layer, the thickness of the Co-rich diamond layer, and the amount of cutting tool flank wear when the diamond sintered compact was employed as the cutting edge of a cutting tool.

The diamond sintered compacts in sample nos. 21 to 28 were produced in this example using the same fabrication method and fabrication conditions as in Example 1, while using a substrate with the composition WC-7%Co-0.1% TiC coated with a paste prepared by mixing diamond powder and Co powder in the ratio shown in Table 2 and using 85 weight % diamond powder and 15 weight % Co powder for the mixing proportions of the diamond grains and binder (Co powder) used as the starting material. Sample no. 29 was fabricated using the same starting material, which was filled into the tantalum container so as to be in contact with a substrate having a composition of WC-5% Co used as the cemented carbide substrate; fabrication was carried out using the same fabrication conditions as in Example 1. The grain sizes of the diamond grains in the resulting main diamond layer were examined by SEM (scanning electron microscope) secondary electron imaging, yielding an average grain size of 8 μm.

The same measurement methods as in Example 1 were also used to measure the residual compressive stress and Co-rich diamond layer thickness of the obtained diamond sintered compact and the amount of cutting tool flank wear when applied as a cutting tool. The difference between the Co content of the main diamond layer and the Co content of the Co-rich diamond layer was determined by the following method. The results are collected in Table 2.

Determination of the Difference Between the Co Content of the Main Diamond Layer and the Co Content of the Co-Rich Diamond Layer A flat square test specimen with dimensions of about length 3 mm×width 3 mm×thickness 0.3 mm was cut out. The test specimen was prepared in two types for each sample: a test specimen in which the main diamond layer was the outermost layer and a test specimen in which the Co-rich diamond layer was the outermost layer. These test specimens were subjected to a Co dissolution treatment by immersion in a Co-dissolving solution in a sealed container. The dissolution treatment was carried out for 3 hours at a temperature between 120 and 150° C. using as the Co-dissolving solution fluoronitric acid prepared by mixing 40 mL of a two-fold dilution of nitric acid having a concentration of at least 60% but less than 65% with 10 mL hydrofluoric acid having a concentration of at least 45% but less than 50%. The area ratio of the void regions generated by the dissolution treatment was then calculated as the Co content of the particular layer for the main diamond layer surface of the treated test specimen and the Co-rich diamond layer surface of the treated test specimen, and the difference between these calculated values was determined.

TABLE 2

| Sample no. | mixing ratio between diamond grains and Co powder (wt %) | difference between the Co contents (vol %) | thickness of the Co—rich diamond layer (mm) | residual compressive stress in the main diamond layer (GPa) | amount of flank wear (μm) | remarks |
| --- | --- | --- | --- | --- | --- | --- |
| 21 | 80:20 | 1.1 | 0.009 | 3.208 | breakage occurred | comparative product |
| 22 | 75:25 | 0.6 | 0.012 | 3.007 | breakage occurred | comparative product |
| 23 | 70:30 | 1.0 | 0.010 | 2.885 | 34 | product according to the present invention |
| 24 | 60:40 | 10.5 | 0.020 | 2.738 | 32 | product according to the present invention |
| 25 | 50:50 | 19.8 | 0.055 | 2.497 | 32 | product according to the present invention |
| 26 | 40:60 | 28.9 | 0.070 | 2.159 | 36 | product according to the present invention |
| 27 | 35:65 | 29.4 | 0.073 | 1.442 | delamination occurred | comparative product |

TABLE 2-continued

| Sample no. | mixing ratio between diamond grains and Co powder (wt %) | difference between the Co contents (vol %) | thickness of the Co—rich diamond layer (mm) | residual compressive stress in the main diamond layer (GPa) | amount of flank wear (μm) | remarks |
|---|---|---|---|---|---|---|
| 28 | 30:70 | 30.3 | 0.069 | 1.494 | delamination occurred | comparative product |
| 29 | — | — | — | 0.826 | 58 | comparative product |

In the case of sample no. 21, the thickness of the Co-rich diamond layer was small at 0.009 mm, while in the case of sample no. 22 the difference between the Co content of the main diamond layer and the Co content of the Co-rich diamond layer was not more than 1 volume %. As a consequence, the residual compressive stress in the diamond sintered compact exceeded 3 GPa and chipping occurred with both sample nos. 21 and 22 in the cutting experiment in which the samples had been formed into the cutting edge of a cutting tool. With sample no. 23, the thickness of the Co-rich diamond layer was 0.010 mm and the difference between the Co content of the main diamond layer and the Co content of the Co-rich diamond layer was 1.0 volume %, and in this case chipping was not produced and the amount of flank wear was also less than for sample no. 29, which is a prior-art diamond sintered compact. In the case of sample no. 24, the difference between the Co content of the main diamond layer and the Co content of the Co-rich diamond layer was 10.5 volume % and the Co-rich diamond layer had a thickness of 0.020 mm, and here the amount of flank wear was smaller than for sample no. 23 and the best wear resistance was seen.

These test results demonstrate that there is little effect with regard to absorption by the Co-rich diamond layer of the difference in the Young's modulus when the thickness of the Co-rich diamond layer is less than 0.01 mm or when the difference in Co content between the main diamond layer and the Co-rich diamond layer is less than 1 volume %, and that as a consequence there is a large residual strain in the diamond sintered compact and the chipping resistance is inadequate. Thus, the difference between the Co content of the main diamond layer and the Co content of the Co-rich diamond layer is preferably at least 1 volume % and the thickness of the Co-rich diamond layer is preferably at least 0.01 mm. It is even more preferable for the difference between the Co content of the main diamond layer and the Co content of the Co-rich diamond layer to be at least 10 volume % and for the thickness of the Co-rich diamond layer to be at least 0.020 mm.

Due to the high Co mixing rate, the thickness of the Co-rich diamond layer exceeded 0.07 mm in sample no. 27 and the difference between the Co content of the main diamond layer and the Co content of the Co-rich diamond layer exceeded 30 volume % in sample no. 28. As a consequence, the Co-rich diamond layer was unable to withstand the cutting resistance and the main diamond layer underwent delamination. In contrast to this, in the case of sample no. 26, which had a Co-rich diamond layer thickness of 0.070 mm, a high residual compressive stress could be imparted to the diamond sintered compact, which resulted in less flank wear than for sample no. 29 and in the ability to carry out normal operations. In addition, sample no. 25, in which the difference between the Co content of the main diamond layer and the Co content of the Co-rich diamond layer was 19.8 volume % and the thickness of the Co-rich diamond layer was 0.055 mm, had the lowest amount of flank wear in common with sample no. 24 and exhibited an excellent wear resistance.

The preceding demonstrates that the connection strength between the main diamond layer and the cemented carbide substrate is reduced when the difference between the Co content of the main diamond layer and the Co content of the Co-rich diamond layer exceeds 30 volume % or when the Co-rich diamond layer is more than 0.07 mm thick. Accordingly, the difference between the Co content of the main diamond layer and the Co content of the Co-rich diamond layer is preferably no more than 30 volume % and the Co-rich diamond layer is preferably no more than 0.07 mm thick. It is even more preferable for the difference in the Co content to be no more than 20 volume % and for the Co-rich diamond layer to be no more than 0.055 mm thick.

Example 3

Diamond sintered compacts, designated as sample nos. 31 to 34, were fabricated in which the main diamond layer contained diamond grains having the diamond grain size shown in Table 3. The amount of cutting tool flank wear was measured for application of the obtained diamond sintered compacts as the cutting edge of a cutting tool. The diamond content and transverse rupture strength of the obtained diamond sintered compacts was also measured.

The diamond sintered compacts were fabricated by filling the starting material, comprising a mixture of diamond grains and binder (Co—W—Ti alloy (Co: 80 wt %, W: 5 wt %, Ti: 5 wt %), into a tantalum container so as to be in contact with a cemented carbide substrate (disk) having a composition of WC-10% Co. In order to prepare a diamond sintered compact having a Co-rich diamond layer, a heat treatment was carried out for 10 minutes at 1300° C. in a ($CO+CO_2$) reducing atmosphere having a CO concentration of 4% in order to induce the deposition of Co at the interface with the cemented carbide substrate. The diamond was then sintered by holding for ten minutes at a pressure of 6.0 GPa and a temperature of 1550° C. The size of the diamond grains used in the starting material was varied. The residual compressive stress in the obtained diamond sintered compact, the thickness of the Co-rich diamond layer therein, the transverse rupture strength, the amount of cutting tool flank wear in application as a cutting tool, and the transverse rupture strength were measured by the same measurement methods as in Example 1. The diamond content was calculated by carrying out quantitative analysis of the individual elements present in the sintered compact using inductively-coupled plasma (ICP) spectrometric analysis. The results are shown in Table 3.

The average diamond grain size given in Table 3 is the diamond grain size in the main diamond layer as measured by SEM secondary electron imaging.

TABLE 3

| Sample no. | average grain size of the diamond grains (μm) | diamond content (vol %) | residual compressive stress in the main diamond layer (GPa) | thickness of the Co— rich diamond layer (mm) | transverse repture strength (GPa) | amount of flank wear (μm) | remarks |
| --- | --- | --- | --- | --- | --- | --- | --- |
| 31 | 1 | 88.2 | 2.32 | 0.045 | 2.63 | 32 | product according to the present invention |
| 32 | 5 | 90.3 | 2.29 | 0.054 | 2.21 | 31 | product according to the present invention |
| 33 | 10 | 92.1 | 2.36 | 0.049 | 2.01 | 31 | product according to the present invention |
| 34 | 20 | 93.8 | 2.35 | 0.048 | 1.58 | 32 | product according to the present invention |

A Co-rich diamond layer with a thickness of about 0.05 mm was present in all of the sample nos. 31 to 34 obtained in this test. In addition, the residual compressive stress for the main diamond layer was about 2.3 GPa for each sample.

Sample nos. 31, 32, and 33, in which the main diamond layer contained diamond grains with an average grain size no larger than 10 μm, each had a transverse rupture strength of at least 2 GPa, while in contrast to this the transverse rupture strength was reduced in sample no. 34, which contained diamond grains with a large average grain size. It is thus demonstrated that the transverse rupture strength undergoes a substantial decline as the average grain size of the contained diamond grains assumes larger values. In addition, there was almost no difference in wear resistance among all the samples notwithstanding the change in the diamond content with average particle size. These test results demonstrate that the present invention makes it possible to secure a wear resistance that compares favorably with that when the main diamond layer contains diamond grains with an average grain size of 20 to 30 μm, while securing an excellent chipping resistance due to the main diamond layer containing diamond grains with an average grain size no larger than 10 μm. Accordingly, diamond grains with an average grain size no larger than 10 μm are preferred for the diamond grains present in the main diamond layer, while the average diamond grain size is more preferably no larger than 5 μm and even more preferably no larger than 1 μm.

The invention claimed is:

1. A diamond sintered compact that has a cemented carbide substrate and a sintered diamond layer and that is obtained by sintering diamond grains and a binder containing cobalt-containing solvent metal on the cemented carbide substrate, wherein the sintered diamond layer comprises a main diamond layer and a cobalt-rich diamond layer that is disposed between the main diamond layer and the cemented carbide substrate and that has a higher cobalt content than the main diamond layer, and wherein the main diamond layer has a residual compressive stress of 1.5 GPa to 3 GPa.

2. The diamond sintered compact according to claim 1, wherein a compound that contains at least one element selected from titanium, zirconium, hafnium, vanadium, niobium, tantalum, chromium, and molybdenum and at least one element selected from carbon, nitrogen, and oxygen, is present in the main diamond layer in an amount such that the content of the at least one element selected from titanium, zirconium, hafnium, vanadium, niobium, tantalum, chromium, and molybdenum is at least 0.1 weight % but not more than 8 weight %.

3. The diamond sintered compact according to claim 2, wherein the element selected from titanium, zirconium, hafnium, vanadium, niobium, tantalum, chromium, and molybdenum is titanium.

4. The diamond sintered compact according to any of claims 1 to 3, wherein the difference between the cobalt content (volume %) of the cobalt-rich diamond layer and the cobalt content (volume %) of the main diamond layer is from 1 to 30 volume %.

5. The diamond sintered compact according to any of claims 1 to 3, wherein the thickness of the cobalt-rich diamond layer is at least 0.01 mm but not more than 0.07 mm.

6. The diamond sintered compact according to any of claims 1 to 3, wherein the cemented carbide substrate is a substrate with a Young's of 550 to 650 GPa and a Co content of 5.0 to 15.0 weight %.

7. The diamond sintered compact according to any of claims 1 to 3, wherein the cemented carbide substrate contains a compound that contains titanium and at least one element selected from carbon, nitrogen, and oxygen, and wherein the content of this compound is 0.1 to 8 weight %.

8. The diamond sintered compact according to claim 7, wherein the compound is titanium carbide.

9. The diamond sintered compact according to any of claims 1 to 3, wherein the average grain size of the diamond grains of the main diamond layer is no greater than 10 μm.

10. An indexable insert for a cutting tool, wherein the cutting edge of the corner region is formed by the diamond sintered compact according to any of claims 1 to 3.

* * * * *